(12) United States Patent
Civelli et al.

(10) Patent No.: US 9,268,462 B2
(45) Date of Patent: Feb. 23, 2016

(54) EXTERNAL ACTION SUGGESTIONS IN SEARCH RESULTS

(75) Inventors: Jay Pierre Civelli, Sunnyvale, CA (US); Theodore Nicholas Choc, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 80 days.

(21) Appl. No.: 13/585,744

(22) Filed: Aug. 14, 2012

(65) Prior Publication Data

US 2014/0053088 A1 Feb. 20, 2014

(51) Int. Cl.
*G06F 3/00* (2006.01)
*G06F 3/0481* (2013.01)
*G06F 17/30* (2006.01)

(52) U.S. Cl.
CPC ...... *G06F 3/04817* (2013.01); *G06F 17/30979* (2013.01); *G06F 17/30991* (2013.01)

(58) Field of Classification Search
USPC ........... 715/760, 745, 864, 747, 865; 707/723
See application file for complete search history.

(56) References Cited

U.S. PATENT DOCUMENTS

| | | | |
|---|---|---|---|
| 2007/0033171 A1* | 2/2007 | Trowbridge | 707/3 |
| 2010/0161594 A1* | 6/2010 | Prasad et al. | 707/722 |
| 2010/0306191 A1 | 12/2010 | LeBeau et al. | |
| 2011/0113062 A1 | 5/2011 | Quinlan et al. | |
| 2013/0031091 A1* | 1/2013 | El Daher et al. | 707/723 |
| 2013/0282683 A1* | 10/2013 | Kohavi et al. | 707/706 |

FOREIGN PATENT DOCUMENTS

| | | |
|---|---|---|
| KR | 10-2006-0011798 | 2/2006 |
| KR | 10-2007-0067284 | 6/2007 |
| KR | 10-2010-0132657 | 12/2010 |

OTHER PUBLICATIONS

Arvind Kumar Garg et al., Method and System for Enabling a User to Select Search Results and Aggregate Selected Search Results, Aug. 26, 2011, IP.com Electronic Publication.*
IBM et al., Using search results for bulk metadata modification, Jun. 26, 2009, IP.com Electronic Publication.*
"The Auto-Complete List Doesn't Remember Names or Email Addresses," Microsoft Office, Printed Aug. 14, 2012, retrieved from <http://office.microsoft.com/en-us/outlook-help/the-auto-complete-list-doesnt-remember-names-or-email-addresses-HA102534585.aspx>.

(Continued)

*Primary Examiner* — Linh K Pham
*Assistant Examiner* — Tam Tran
(74) *Attorney, Agent, or Firm* — McDermott Will & Emery LLP (57) ABSTRACT

Methods for suggesting in search results an action that is to be performed in an external application based on a previous search query are provided. In one aspect, a method includes receiving, from an application on a device, a search query that was previously submitted by a user or another user, and providing, as a result of the search query, an interface to perform an action to launch an external application on the device, wherein the action was previously selected by the user or the other user in response to previous results of the search query. Systems, graphical user interfaces, and machine-readable media are also provided.

19 Claims, 7 Drawing Sheets

(56) References Cited

OTHER PUBLICATIONS

D. Sullivan, "How Google Instant's Autocomplete Suggestions Work," Search Engine Land, Apr. 6, 2011, retrieved from <http://searchengineland.com/how-google-instant-autocomplete-suggestions-work-62592>.

"Maps Personalized Suggestions," Google Maps, Printed Aug. 14, 2012, retrieved from <http://support.google.com/maps/bin/answer.py?hl=en&answer=173398>.

* cited by examiner

EXTERNAL ACTION SUGGESTIONS IN SEARCH RESULTS

BACKGROUND

1. Field

The present disclosure generally relates to the transmission of data over a network, and more particularly to the use of a computing device to communicate over a network.

2. Description of the Related Art

A user of a web browser on a mobile device often submits a search query to a search engine in the mobile web browser in order to view a listing of web pages responsive to the search query. When the listing of web pages is displayed in the mobile web browser, the user can select a web page from the listing for display. The displayed web page can include a command that, when selected, launches an external application on the mobile device, such as a telephone application or a map application. For example, if the user submits a search query for "pizza," and selects a web page titled "Pizza ABC," the "Pizza ABC" web page can include a hyperlink that the user selects in order to call Pizza ABC from the user's mobile device.

SUMMARY

According to one embodiment of the present disclosure, a computer-implemented method for suggesting in search results an action that is to be performed in an external application based on a previous search query is provided. The method includes receiving, from an application on a device, a search query that was previously submitted by a user or another user, and providing, as a result of the search query, an interface to perform an action to launch an external application on the device, wherein the action was previously selected by the user or the other user in response to previous results of the search query.

According to another embodiment of the present disclosure, a system for suggesting in search results an action that is to be performed in an external application based on a previous search query is provided. The system includes a memory that includes an interface to perform an action to launch an external application on a device. The action was previously selected by a user or another user in response to previous results of a search query. The system also includes a processor configured to receive, from a web browser on the device, a search query that is substantially similar to the previously submitted search query, and provide, as a result of the search query, the interface to perform the action to launch the external application on the device in response to the received search query.

According to one embodiment of the present disclosure, a machine-readable storage medium includes machine-readable instructions for causing a processor to execute a method for suggesting in search results an action that is to be performed in an external application based on a previous search query is provided. The method includes receiving, from an application on a device, a search query that was previously submitted by a user or another user, and providing, as an item in an item listing of the results of the search query, an identifier of an action to launch an external application on the device. The action was previously selected by the user or the other user from a web page responsive to the previously submitted search query. The action includes at least one of a displayable address or a displayable title of the web page and is the last action selected by the user or the other user prior to a submission of a new search query by the user or the other user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Currently, if a user submits a search query for "pizza," and selects a web page titled "Pizza ABC," the "Pizza ABC" web page can include a hyperlink that the user selects in order to call Pizza ABC from the user's mobile device. If, however, the user later decides to submit the same search query intending to launch the same external application, the user must again locate the previously selected web page that included the previously selected command, load the previously selected web page, and then select the command. The disclosed application, which can be a mobile web browser, remembers a user's previous selection of a command to launch an external application in response to a result of a search query, and displays the command for the user to select as a suggestion if the user later submits the same or similar search query. Specifically, after a user submits a first search query, the client stores the last command (or all of the commands) selected by the user to launch an external application from a web page in the mobile web browser before the users submits a second, different search query. If the user later re-submits the first search query, or a substantially similar variation thereof, then the web browser will display, in the search results, an action for the user to select in order to perform the same command the user previously selected. Similarly, another user's previous selection of a command can also be displayed in the search results.

For example, a user initially submits a search query "pizza," and selects a web page titled "Pizza ABC" from the search results. The "Pizza ABC" web page includes a hyperlink that the user selects in order to call Pizza ABC from a telephone application on the user's mobile device. If the user later submits the search query "pizza" to the mobile web browser, the mobile web browser will display a link to call Pizza ABC as part of the results to the search query. When selected by the user, the link immediately places a telephone call to Pizza ABC using the telephone application.

Although many examples provided herein describe a user's information (e.g., search submissions and action selections) being stored in memory, the user can, at any time, delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Figure 1:
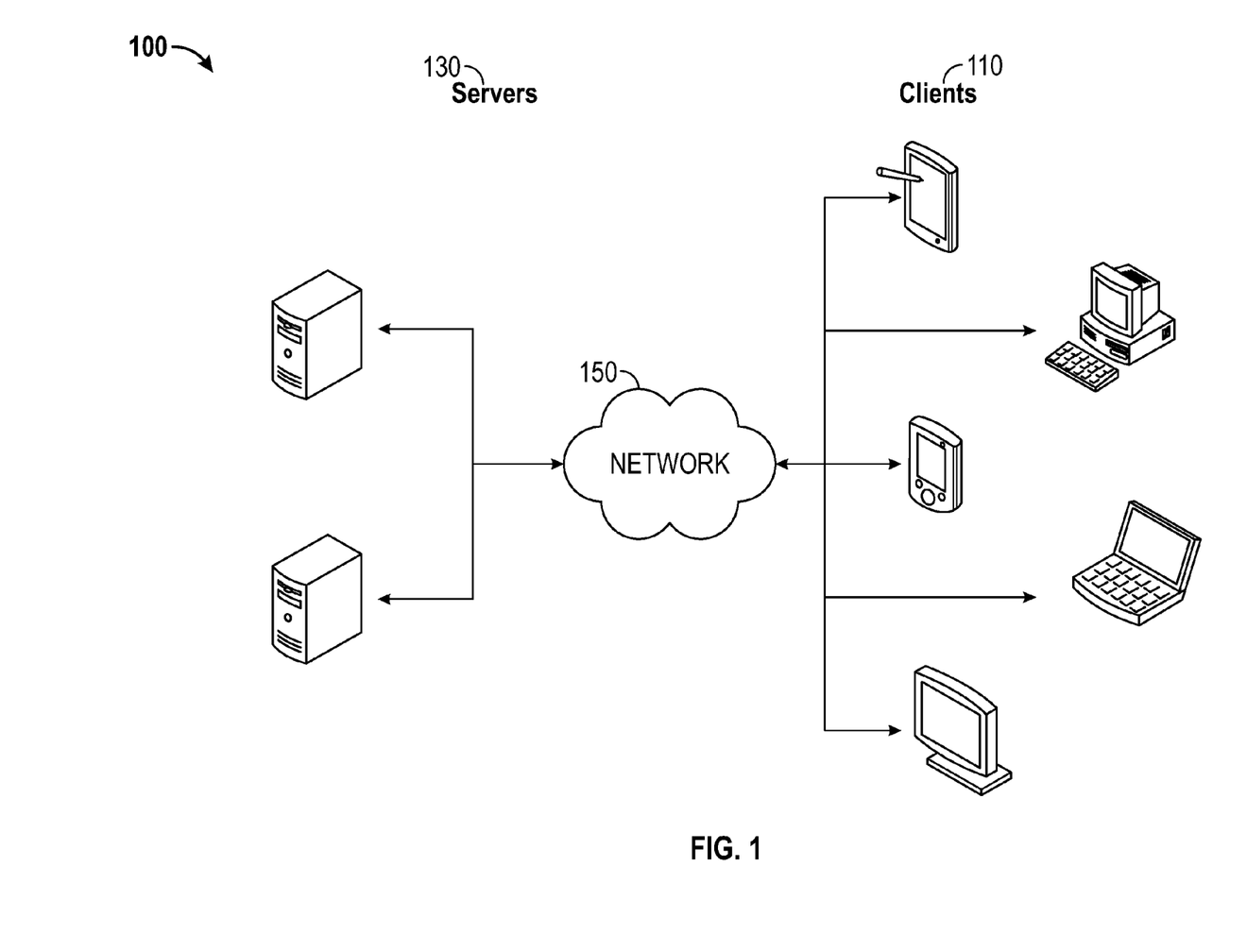
FIG. 1 illustrates an example architecture for suggesting in search results an action that is to be performed in an external application based on a previous search query.

Turning to the drawings, FIG. 1 illustrates an example architecture 100 for suggesting in search results an action that is to be performed in an external application based on a previous search query. The architecture 100 includes servers 130 and clients 110 connected over a network 150. The clients 110 can be, for example, desktop computers, mobile computers, tablet computers, mobile devices (e.g., a smartphone or PDA), set top boxes (e.g., for a television), video game consoles, or any other devices having appropriate processor, communications capabilities, and memory for preparing a content file for printing. In certain aspects, however, a client that is a mobile device or tablet computer particularly benefits from the process disclosed herein.

Each client 110 is configured to receive search queries in an application, such as a web browser, from a user, and provide, for display, results of the search queries to the user in the application on the client 110. If the user selects an action to launch an external application after the search query results are displayed, the client 110 stores information on the selected action. The next time the user submits the same or similar search query, the application provides the same or similar results, but also includes information on the action so that the user can immediately select the action for execution. As such, the user does not need to remember from when the user last submitted the search query and selected the action the path by which the user located the web page for launching the action. The information on the action that is displayed in the search results can also include information on the web page from which the action was previously selected, such as the name or address of the web page. In certain aspects, the client 110 can remember one or many actions. The action can be the last action(s) selected before the submission of a new search query, or the first action(s) selected after the submission of the search query.

The clients 110 can be connected to a network 150 that can include any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

In certain aspects, a client 110 can connect to one or many servers 130 over the network 150 to obtain information on actions selected by other users in response to search queries. Thus, the client 110 can also present the user of the client 110 with an action in the search results that was selected by another user in response to the same search query. The servers 130 can be any device having an appropriate processor, memory, and communications capability for providing information on actions selected by other users.

Figure 2:
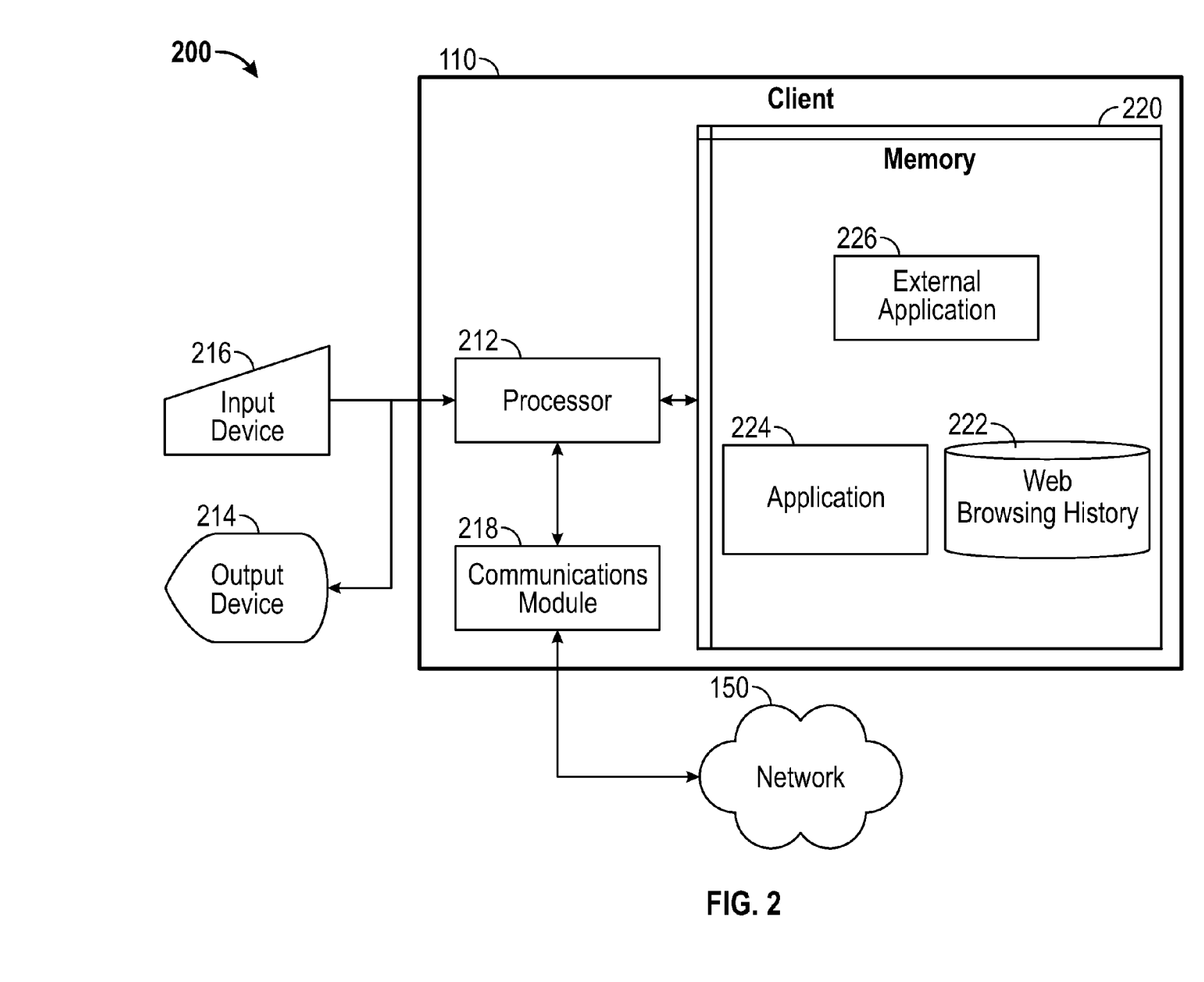
FIG. 2 is a block diagram illustrating the example client from the architecture of FIG. 1 according to certain aspects of the disclosure.

FIG. 2 is a block diagram illustrating an example client 110 in the architecture 100 of FIG. 1 according to certain aspects of the disclosure. The client 110 is connected to the network 150 via a communications module 218. The communications module 218 is configured to interface with the network 150 to send and receive information, such as data, requests, responses, and commands to other devices on the network. The communications module 218 can be, for example, a modem or Ethernet card.

The client 110 includes a processor 212, the communications module 218, and the memory 220 that includes an application 224, a web browsing history 222, and an external application 226 configured to be launched by an appropriate action in the application 224. The application 224 is configured to receive search queries using input device 216, which can be a touchscreen input interface, and provide results of the search query for display on the output device 214, which can be a touchscreen display interface. The web browsing history 222 includes information on actions selected in the application 224 to launch the external application 226 after a submission of a search query. The web browsing history 222 can also be updated with additional information on actions selected by users on other client devices 110, such as by downloading the additional information from a server 130 (not illustrated) over the network, and updating the web browsing history 222 accordingly. The external application 226 can be, for example and without limitation, a mapping application, telephone application, multimedia application, or social networking application. The external application 226, which is external (e.g., independently compiled) to the application 224, is configured to be launched by an appropriate action selected in the application, such as selecting a telephone number displayed in the application on a smartphone 110 in order to launch a telephone application 226 to dial the telephone number.

The processor 212 of the client 110 is configured to execute instructions, such as instructions physically coded into the processor 212, instructions received from software (e.g., the application 224) in memory 240, or a combination of both. For example, the processor 212 of the client 110 executes instructions to receive, from the application 224, a search query that was previously submitted by a user (e.g., of the client 110) or another user (e.g., on another client 110). For example, a user may submit the search query "pizza" at one time, and then at a later time submit the same search query "pizza." The received search query does not need to be identical to the previously submitted search query, but may be substantially similar to the previously submitted search query. For example, a user may submit the search query "pizza" at one time, and then at a later time submit the search query "pizza abc." As such, one query may be a subset of another query, or have a pre-determined number of different characters of the other query.

The processor 212 is also configured to execute instructions to provide, as a result of the search query, an interface to perform an action to launch the external application 226 on the client 110. The action was previously selected on the client 110 (e.g., by the user of the client) or on another client 110 (by a user of the other client 110) in response to previous results of the search query. An identifier of the action (e.g., text describing the action, an image associated with the action, and/or a sound associated with the action) can be provided as an item in an item listing of the results of the search query. For example, a user may have previously selected an action to dial a telephone number for A's Pizzeria from a web page shown in the results for the search query "pizza." If the user at a later time submits the search query "pizza," the action to dial the telephone number for A's Pizzeria can be shown as an item in the search results.

The action that is provided as a result of the search query can be any number of the first actions or last actions selected by a user prior to a submission of a new search query by the user. For example, if a user submits a search for "pizza" and the first action to launch an external application that the user selects thereafter is to place a telephone call to Pizza ABC, then the action that is provided as the result of a subsequent search for "pizza" will be an action to call Pizza ABC. As another example, if a first user submits a search for "pizza" and the last action to launch an external application that the user selects before submitting a new search "cars" is to map directions to Pizza ABC, then the action that is provided as the result of a subsequent search for "pizza" by that same user or another user will be an action to map directions to Pizza ABC.

The action that is provided as a result of the search query can be previously selected by a user from a web page that is responsive to a previously submitted search query. The web page can be included in the previous results of the search query, or can be linked to from or otherwise associated with a different web page that is included in the previous results of the search query. The action, when displayed as a result of the search query, can include a displayable address (e.g., Uniform Resource Locator) of the web page from which the action was previously selected, and/or a title of the web page from which the action was previously selected.

Figure 3:
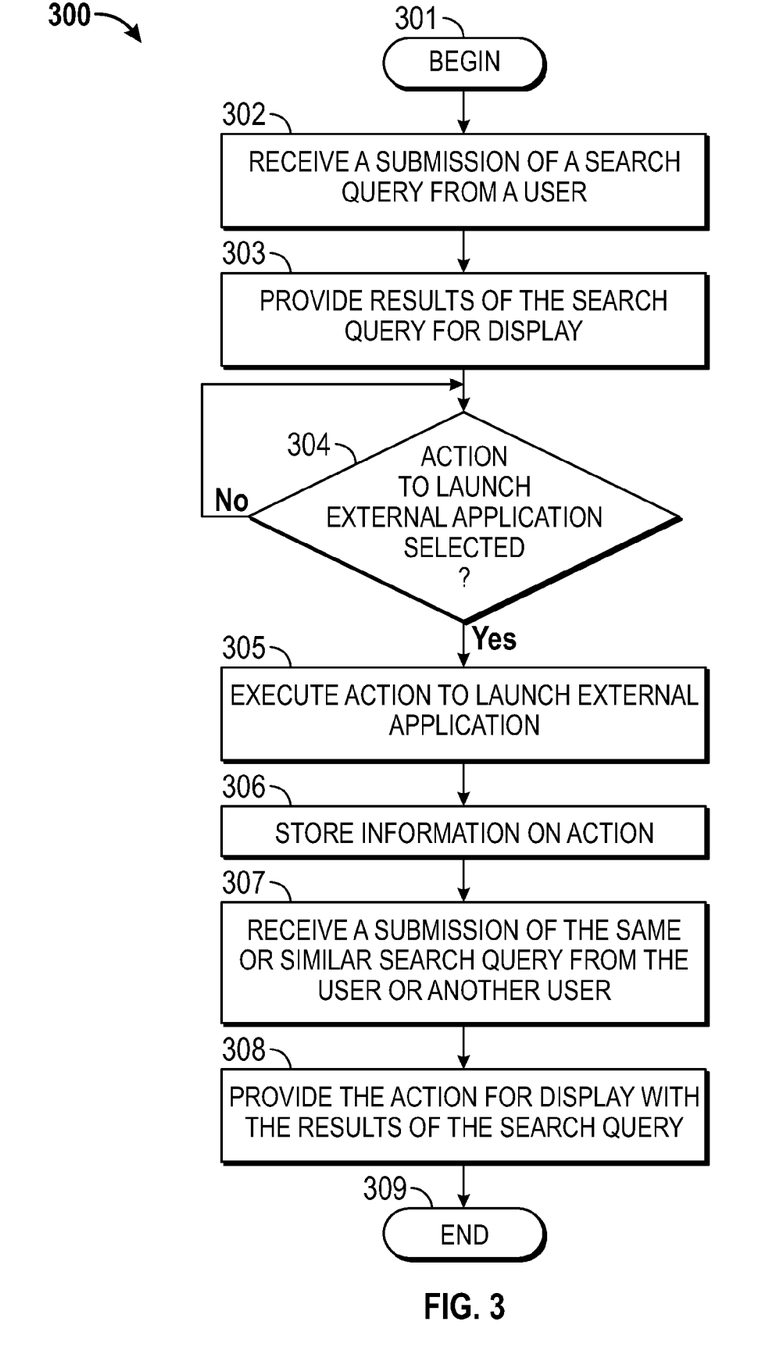
FIG. 3 illustrates an example process for suggesting in search results an action that is to be performed in an external application based on a previous search query using the example client of FIG. 2.

FIG. 3 illustrates an example process 300 for suggesting in search results an action that is to be performed in an external application based on a previous search query using the example client 110 of FIG. 2. While FIG. 3 is described with reference to FIG. 2, it should be noted that the process steps of FIG. 3 may be performed by other systems.

The process 300 begins by proceeding from beginning step 301 when a user loads an application 224 to step 302 when a submission of a search query from a user is received in the application 224. Next, in step 303, results of the search query are provided for display on the output device 214 of the client 110. The process 300 then proceeds to decision step 304 in which a determination is made whether an action to launch an external application 226 is selected. When an action to launch the external application 226 is selected, the process 300 proceeds to step 305, otherwise the process 300 remains at decision step 304. In step 305, the action is executed to launch the external application 226, and information on the action is stored in step 306 in web browsing history 222 locally on the client 110. In certain aspects, information on the action can alternatively or additionally be provided to a server 130, as described above. In step 307, a submission of the same or similar search query from the same user or a different user is received. In step 308, the action that was previously selected in step 304 and executed in step 305 is provided for display with the results of the search query submitted in step 307. The process 300 then ends.

FIG. 3 sets forth an example process 300 for suggesting in search results an action that is to be performed in an external application based on a previous search query using the example client 110 of FIG. 2. An example will now be described using the example process 300 of FIG. 3, an application 224 that is a web browser, a search query for "pizza" submitted to the web browser on a smartphone 110, and an action selected from the search results to call a pizzeria using an external telephone application on the smartphone 110.

Figure 4A:
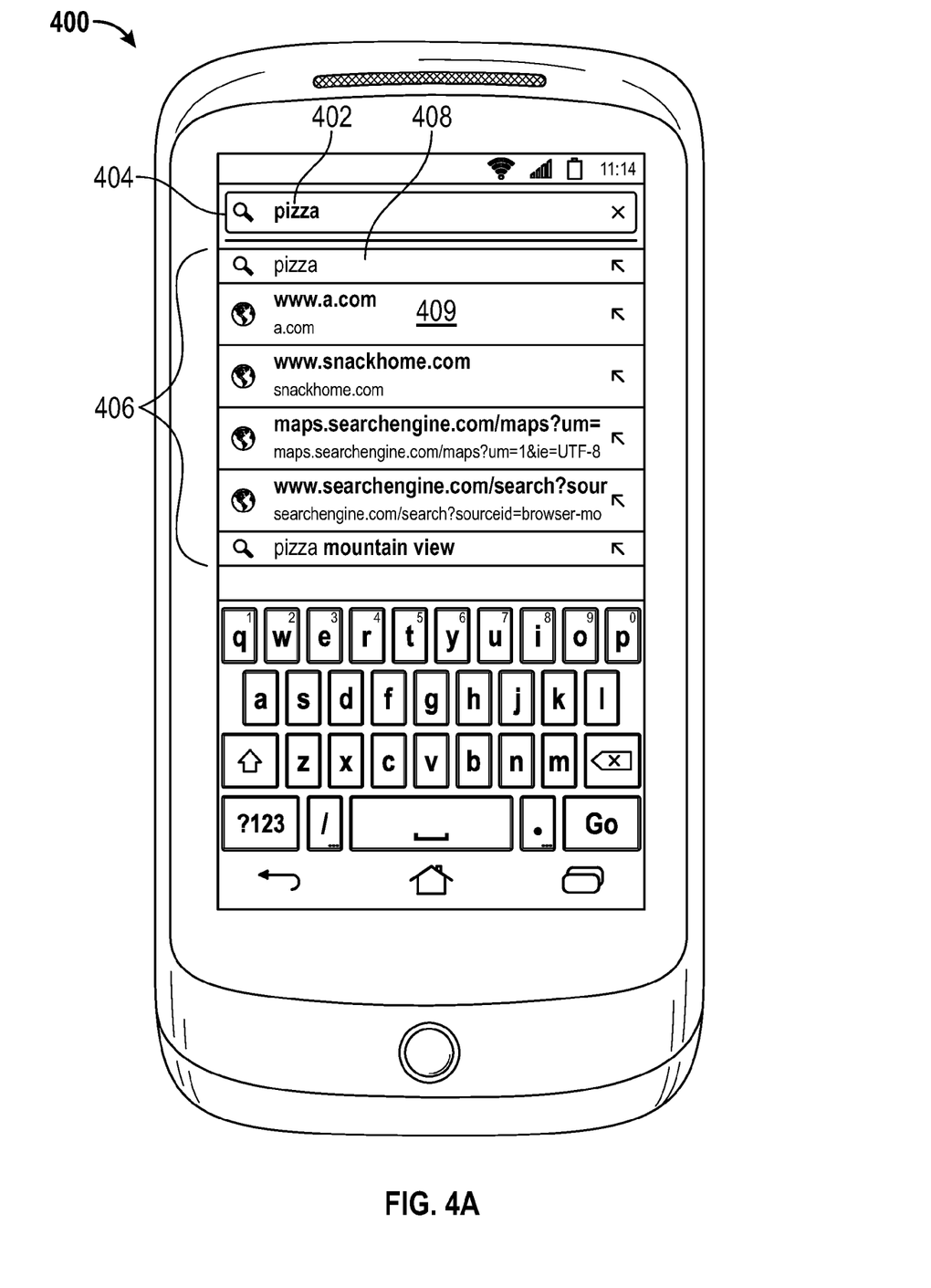
FIGS. 4A-4C are example illustrations associated with the example process of FIG. 3.

The process 300 begins by proceeding from beginning step 301 when a user loads a web browser 224 on the smartphone 110 to step 302 when the user submits a search query for "pizza" in the web browser 224, as provided in the example illustration 400 of FIG. 4A. Specifically, the user enters the search query "pizza" 402 into a search field 404. Next, in step 303, results 406 of the search query are provided for display. The results 406 include a request for the user to manually submit of the search query "pizza" 406, as the results 406 are provided for display automatically before the search query 402 is submitted by the user (e.g., it is submitted by the client 110 in order to immediately provide the results 406).

The process 300 then proceeds to decision step 304 in which a determination is made whether an action to launch an external application 226 is selected. The user, however, selects the first search result, for www.a.com 409. The determination is made that the action of selecting the first search result 409 is not an action to launch an external application 226, so the process 300 remains at decision step 304. The user continues to browse the World Wide Web after selecting the first search result 409, viewing multiple different web pages, until the user views a web page titled "A's Pizzeria: Pizza Delivery" that includes a telephone number for A's Pizzeria. The user presses on the displayed telephone number in order to execute a command to launch an external telephone application 226 to call the telephone number for A's Pizzeria. The process 300 determines that an action to launch an external application 226 has been selected, namely the action to call the telephone number for A's Pizzeria using the external telephone application 226, so the process 300 proceeds to step 305. In step 305, the web browser 224 executes the command to launch the external telephone application 226 to call the telephone number for A's Pizzeria. In step 306, information on the action, including the web page's name, the telephone number, and the type of external application 226 called, is stored 306 in web browsing history 222 in the web browsing history 222 in the memory 220 of the smartphone 110.

Figure 4B:
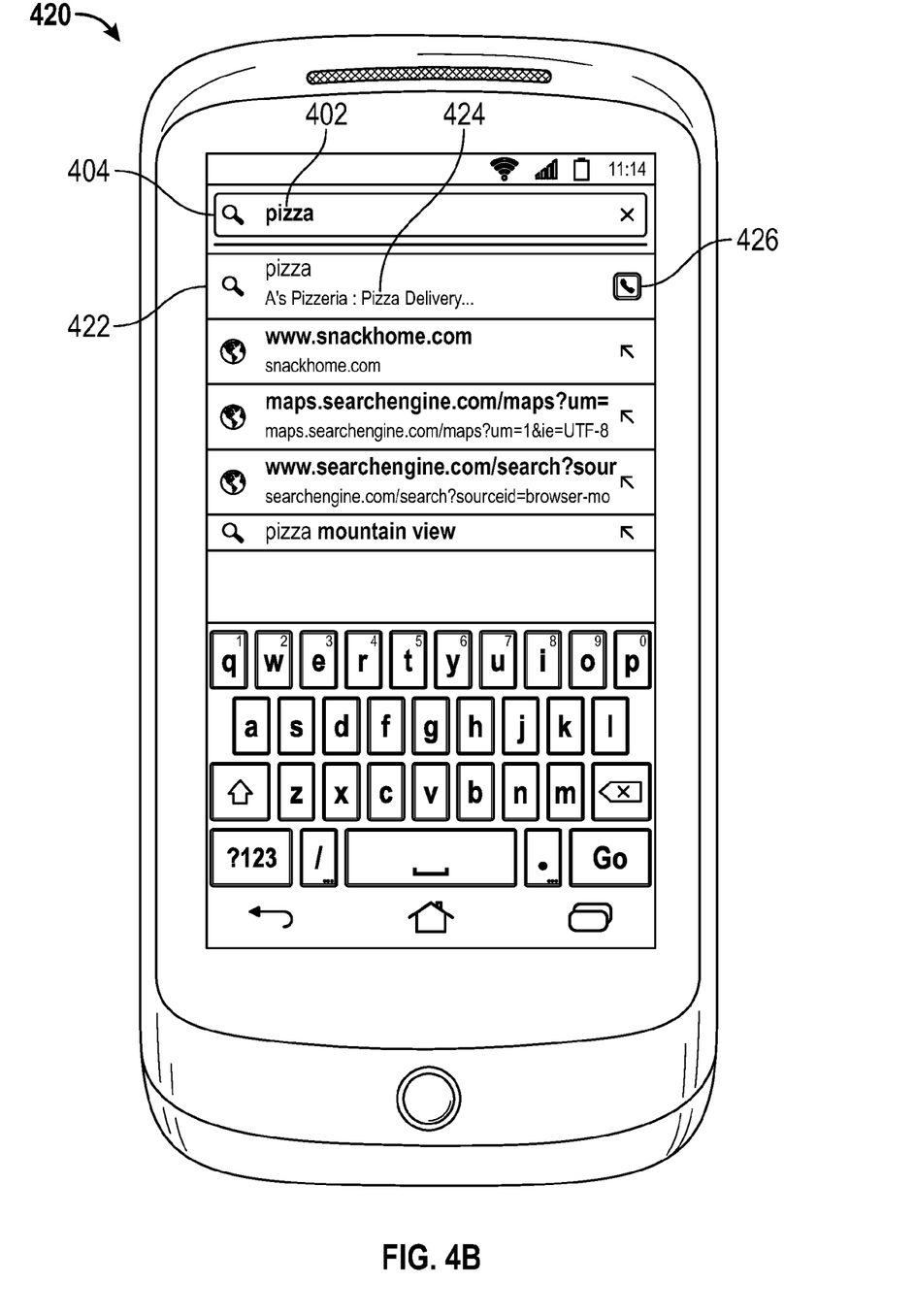
Figure 4C:
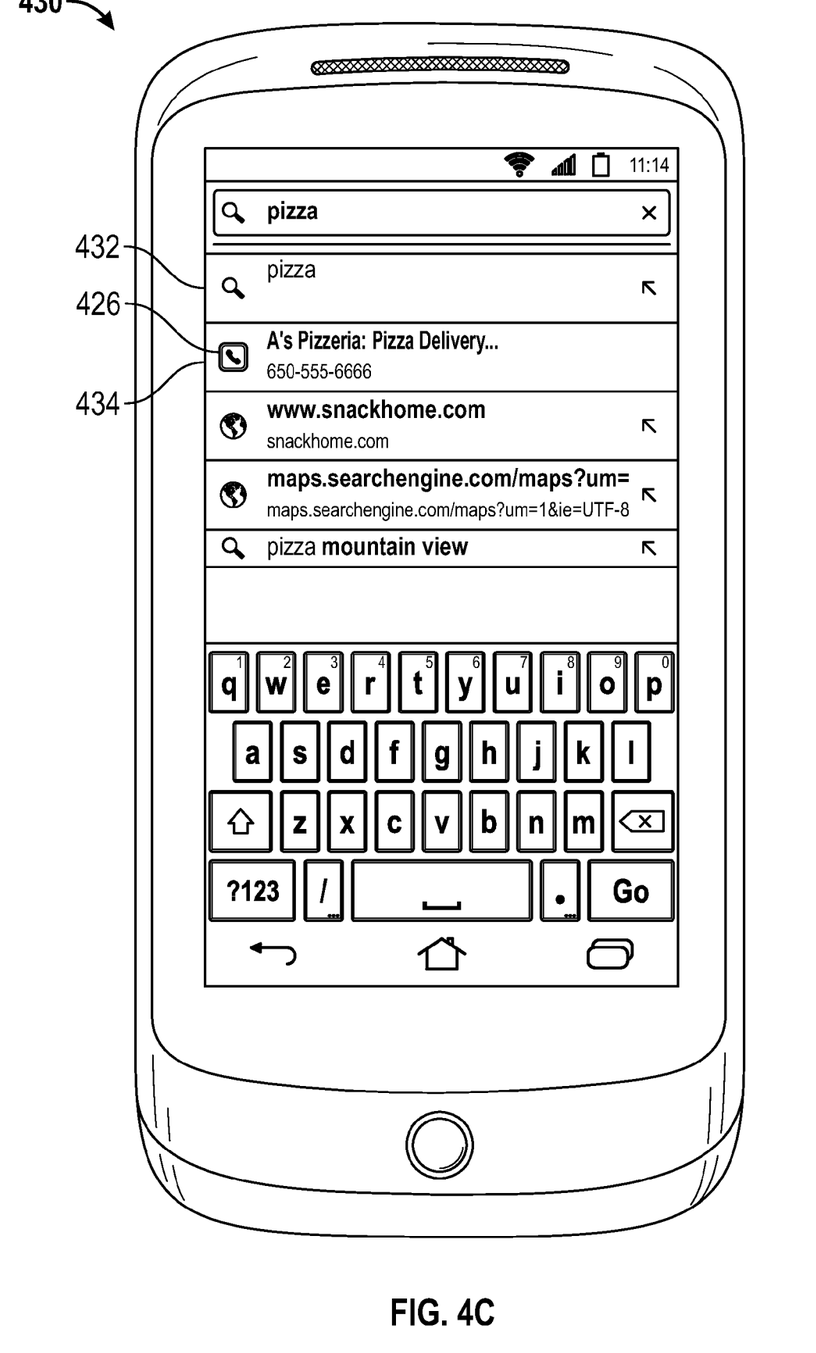

In step 307, several days after step 306, the same user of the smartphone 110 submits the same search query for "pizza" on the smartphone 110 as was submitted in step 302. In step 308, the action that was previously selected in step 304 and executed in step 305, namely the action to call A's Pizzeria, is provided for display with the results of the search query submitted in step 307, as provided in the example illustration 420 of FIG. 4B. The search results include the search query "pizza" 402 in the search field 404 as also illustrated in FIG. 4A, but the search results also include the action 422 to call A's Pizzeria. Specifically, the displayed action 422 includes the search query "pizza" the action is responsive to, the title of the web page from which the action was previously executed, and an icon 426 on the right side of the display indicating the type of action to be performed. The action 422 is displayed with the manual query submission selection for "pizza" 432, but the user cannot manually submit the query for "pizza" by selecting the action 423. Instead, by selecting the action, the user can immediately place a call A's Pizzeria in response to the search request. FIG. 4C provides an example illustration 430 of an alternative display for a suggested action in response to a search query. The action 434 is displayed as separate from the manual query submission selection for "pizza" 432, with an illustrative icon 426 on the left side of the display. The process 300 then ends.

Figure 5:
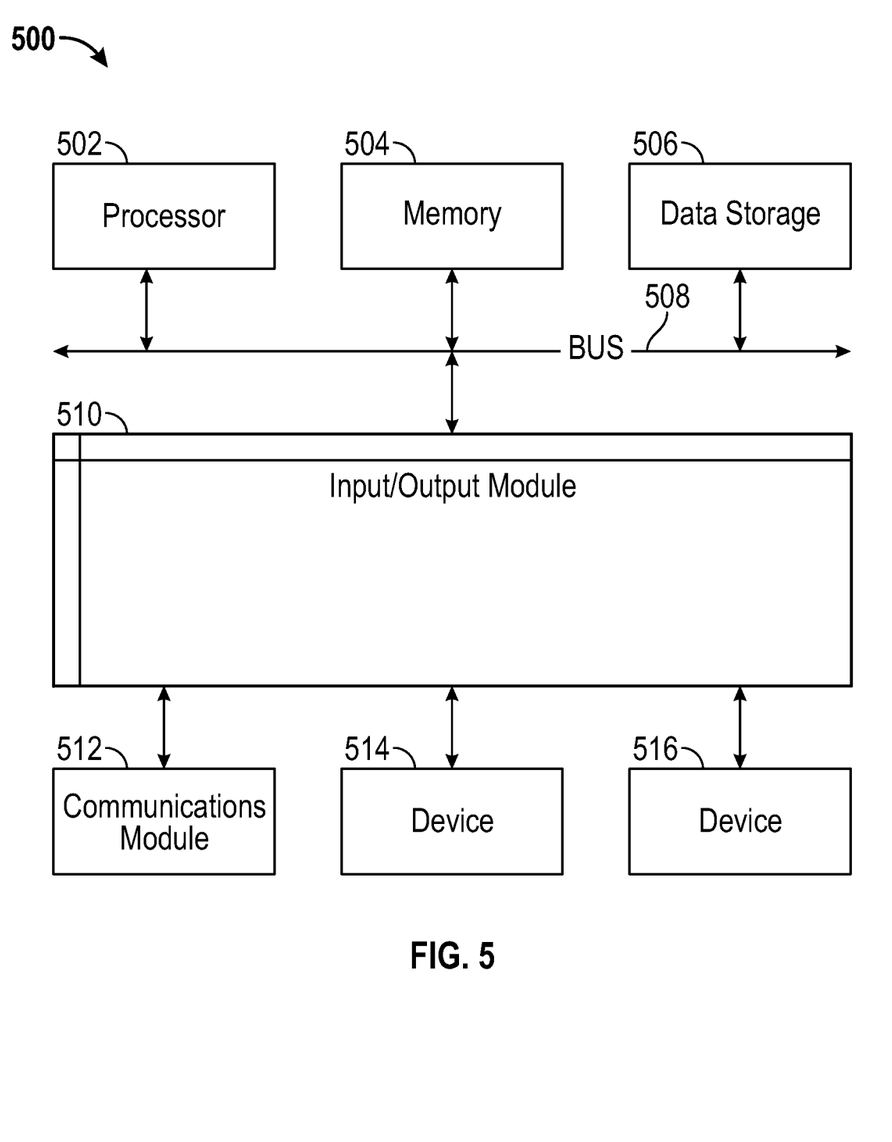
FIG. 5 is a block diagram illustrating an example computer system with which the client of FIG. 2 can be implemented.

FIG. 5 is a block diagram illustrating an example computer system 500 with which the client 110 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, offside rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 218) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, and machine-readable media for suggesting an action to be performed in search results has been described. Upon entry of a search query, a user is presented with at least one action responsive to the query that the user or another user previously selected from a web page responsive to the same or similar search query. When selected, the action launches an external application, such as a telephone application or a mapping application. As a result, the user does not need to again search for the same web page with the same action in order to perform the action.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method, comprising:
receiving, from an application on a device, a second submission of a search query that was previously submitted by a user or another user as a first submission of the search query; and
providing an interface comprising an identifier of an action to launch an external application on the device as an item in an item listing of results of the second submission of the search query,
wherein the action was selected by the user or the other user subsequent to the first submission of the search query from a resource responsive to the first submission of the search query,
wherein the interface to perform the action was not included in results of the first submission of the search query, and the interface to perform the action is included in the results of the second submission of the search query in response to the user or the other user both selecting a result of the first submission of the search query, and then the user or the other user subsequently selecting the action to launch the external application, and
wherein the identifier of the action is based on at least one of a displayable address of the resource responsive to the first submission of the search query, or a title of the resource responsive to the first submission of the search query.

2. The method of claim 1, wherein the first submission of the search query was previously submitted by the user or the other user on another device.

3. The method of claim 1, wherein the resource responsive to the first submission of the search query comprises a web page responsive to the first submission of the search query.

4. The method of claim 3, wherein the web page is included in the results of the first submission of the search query.

5. The method of claim 1, wherein the external application comprises a mapping application, telephone application, multimedia application, or social networking application.

6. The method of claim 1, wherein the action is the last action selected by the user or the other user prior to a submission of a new search query by the user or the other user.

7. The method of claim 1, wherein the action is the first action selected by the user or the other user after the first submission of the search query.

8. The method of claim 1, wherein the second submission of the search query is substantially similar to the first submission of the search query.

9. The method of claim 1, wherein the application is a web browser, and the device is a mobile device.

10. A system comprising:
a memory comprising an interface to perform an action to launch an external application on a device, wherein the action was selected by a user or another user subsequent to a submission of a first search query from a resource responsive to the first submission of the search query; and
a processor configured to:
receive, from a web browser on the device, a second search query that is substantially similar to the first search query; and
provide an interface comprising an identifier of an action to launch an external application on the device as an item in an item listing of results of the second search query,
wherein the interface to perform the action was not included in results of the first search query, and is included in results of the second search query in response to the user or the other user both selecting a result of the first submission of the search query, and then the user or the other user subsequently selecting the action to launch the external application, and
wherein the identifier of the action is based on at least one of a displayable address of the resource responsive to the first submission of the search query, or a title of the resource responsive to the first submission of the search query.

11. The system of claim 10, wherein the first search query was previously submitted by the user or the other user on another device.

12. The system of claim 10, wherein the resource responsive to the first submission of the search query comprises a web page responsive to the first search query.

13. The system of claim 12, wherein the web page is included in the results of the first search query.

14. The system of claim 10, wherein the external application comprises a mapping application, telephone application, multimedia application, or social networking application.

15. The system of claim 10, wherein the action is the last action selected by the user or the other user prior to a submission of a new search query by the user or the other user.

16. The system of claim 10, wherein the action is the first action selected by the user or the other user after the submission of the first search query.

17. The system of claim 10, wherein the application is a web browser, and the device is a mobile device.

18. A non-transitory machine-readable storage medium comprising machine-readable instructions for causing a processor to execute a method, the method comprising:
receiving, from an application on a device, a second submission of a search query that was previously submitted by a user or another user as a first submission of the search query; and
providing, as an item in an item listing of results of the second submission of the search query, an identifier of an action to launch an external application on the device,
wherein the action was previously selected by the user or the other user from a resource responsive to the first submission of the search query,
wherein the interface to perform the action was not included in results of the previously submitted search query, and the interface to perform the action is included in the results of the second submission of the search query in response to the user or the other user both selecting the resource responsive to the first submission of the search query, and then the user or the other user subsequently selecting the action to launch the external application from the resource responsive to the first submission of the search query,
wherein the action is the last action selected by the user or the other user prior to a submission of a new search query by the user or the other user, and
wherein the interface to perform the action to launch the external application comprises an identifier based on at least one of a displayable address of the resource responsive to the first submission of the search query, or a title of the resource responsive to the first submission of the search query.

19. A computer-implemented method, the method comprising:

receiving, from an application on a device, a first submission of a search query;

providing search results responsive to the first submission of the search query and comprising at least one search result;

receiving a selection by a user of the at least one search result;

receiving a selection by the user of an action to launch an external application on the device, wherein the action to launch the external application is not included as a result in the search results;

storing an indicator of the selected action for the search query;

receiving, from the application, a second submission of the search query; and providing for display, in results of the second submission of the search query, an interface to perform the action to launch the external application on the device in response to the user both selecting the at least one search result of the first submission of the search query, and then the user subsequently selecting the action to launch the external application, wherein the interface to perform the action to launch the external application comprises an identifier based on at least one of a displayable address of the resource responsive to the first submission of the search query, or a title of the resource responsive to the first submission of the search query.

* * * * *